US009332195B2

(12) United States Patent
Tanaka

(10) Patent No.: US 9,332,195 B2
(45) Date of Patent: May 3, 2016

(54) IMAGE PROCESSING APPARATUS, IMAGING APPARATUS, AND IMAGE PROCESSING METHOD

(71) Applicant: CANON KABUSHIKI KAISHA, Tokyo (JP)

(72) Inventor: Shin Tanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/457,482

(22) Filed: Aug. 12, 2014

(65) Prior Publication Data
US 2015/0054986 A1 Feb. 26, 2015

(30) Foreign Application Priority Data

Aug. 26, 2013 (JP) ................................. 2013-174429

(51) Int. Cl.
*H04N 5/262* (2006.01)
*H04N 5/232* (2006.01)

(52) U.S. Cl.
CPC .......... *H04N 5/2621* (2013.01); *H04N 5/23212* (2013.01); *H04N 5/23235* (2013.01)

(58) Field of Classification Search
CPC .......... H04N 5/2621; G06T 5/20; G06T 5/001
See application file for complete search history.

(56) References Cited

U.S. PATENT DOCUMENTS

| 7,068,275 | B2 | 6/2006 | Nakamura et al. | |
|---|---|---|---|---|
| 2005/0220358 | A1 | 10/2005 | Blonde et al. | |
| 2009/0096897 | A1* | 4/2009 | Saito | G06T 7/0081 348/241 |
| 2013/0107017 | A1* | 5/2013 | Endo | G03B 7/08 348/49 |
| 2013/0308007 | A1 | 11/2013 | Tanaka | |
| 2014/0211045 | A1 | 7/2014 | Tanaka | |
| 2014/0226041 | A1* | 8/2014 | Eguchi | H04N 5/23229 348/239 |

FOREIGN PATENT DOCUMENTS

| JP | 2000-251090 A | 9/2000 |
|---|---|---|
| JP | 2001-160153 A | 6/2001 |
| JP | 2005-025766 A | 1/2005 |
| JP | 2013-027023 A | 2/2013 |
| WO | 98/44456 A2 | 10/1998 |

* cited by examiner

*Primary Examiner* — Tuan Ho
(74) *Attorney, Agent, or Firm* — Fitzpatrick, Cella, Harper & Scinto

(57) ABSTRACT

An image processing apparatus for adding a blur to an image in use of depth information corresponding to the image, comprising: a conversion unit configured to convert the depth information into blur size information; a division unit configured to divide the image into a plurality image areas having a same blur size; an image generation unit configured to perform blur processing on each of the plurality of image areas with the blur size to generate blurred images; and a synthesizing unit configured to synthesize the plurality of blurred images generated by the image generation unit.

20 Claims, 6 Drawing Sheets

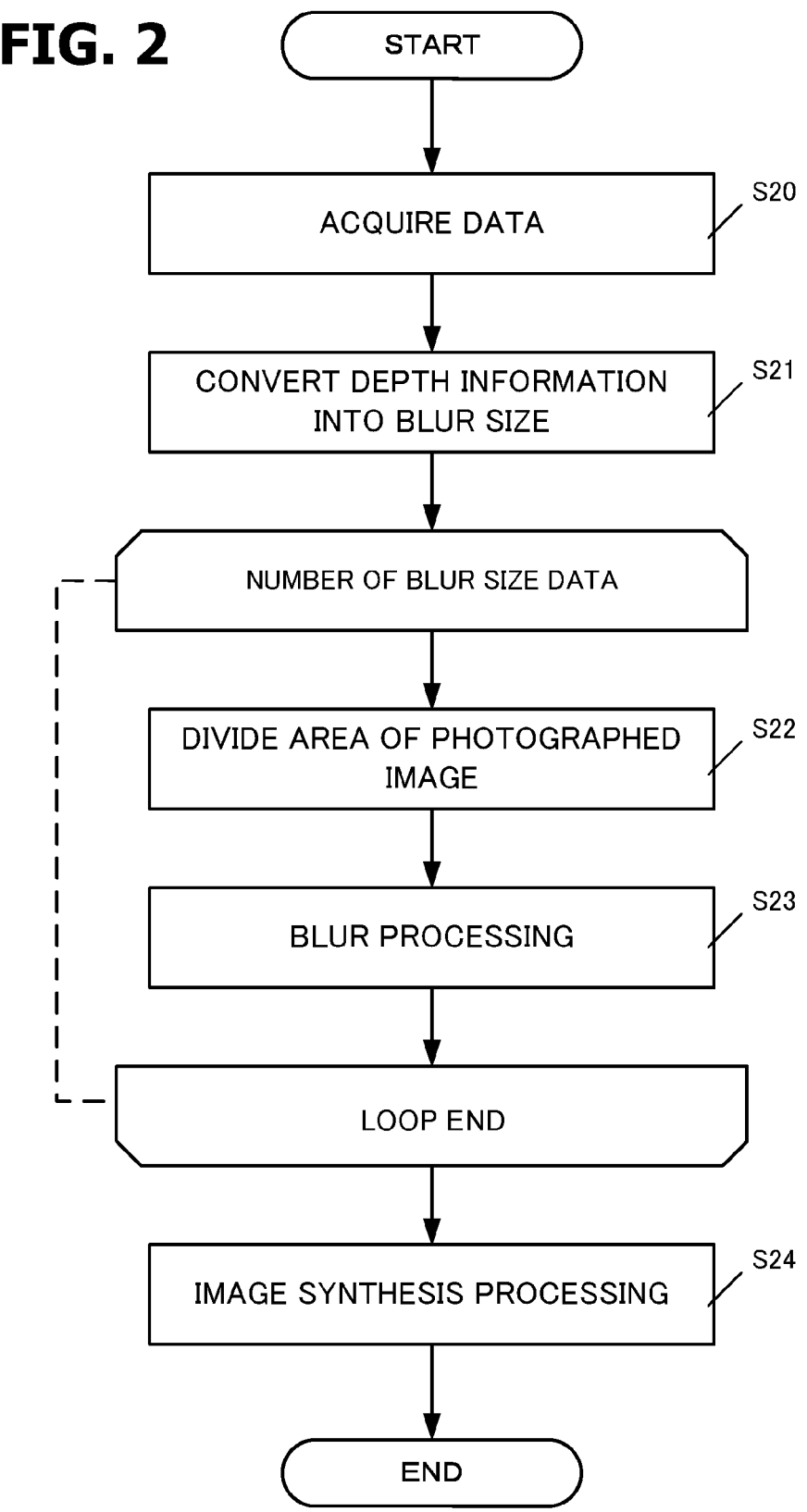

IMAGE PROCESSING APPARATUS, IMAGING APPARATUS, AND IMAGE PROCESSING METHOD

BACKGROUND OF THE INVENTION

1. Field of the Invention

The present invention relates to digital image processing, and more particularly to an image processing method and apparatus that adds a blur to an image.

2. Description of the Related Art

As a photographing technique of a camera, a photographing method, for emphasizing a target object by intentionally blurring a portion other than the object (e.g. background), is known. A problem, however, is that a sufficient blur cannot be generated in a compact camera, since the depth of field cannot be decreased because the image sensor is small. Therefore recently a technique is proposed to generate an image where the background or the like is blurred by adding a blur later by digital image processing. For example, in the case of a blur generation apparatus disclosed in Patent Document 1, blur processing by convolution processing is performed for each equal depth range using a photographed image and a depth map, and the depth boundary is synthesized by special processing, so as to efficiently generate a blurred image. Patent Document 2 discloses an image generation system to efficiently generate a blurred image by determining the blur target pixels based on the depth value (depth map), and shifting the texture image by a predetermined amount.

Patent Document 1: Japanese Patent Application Laid-Open No. 2005-25766
Patent Document 2: Japanese Patent Application Laid-Open No. 2001-160153

SUMMARY OF THE INVENTION

According to the method disclosed in Patent Document 1, the area is divided by defining the minimum depth and the maximum depth, but nothing in particular is disclosed or is written concerning the front blur and the rear blur. "Front blur" or "rear blur" refers to the blur effect that is generated by the existence of an object at the front or the rear of a focus position.

Patent Document 2, on the other hand, discloses that the front blur and the rear blur can be simultaneously calculated by simultaneously performing blur processing on areas that are at a same distance to the front and the back from the focus position. However a problem is that an unnatural blurred image is acquired if the front blur and the rear blur are calculated based on the distance from the object. This is because the amount of change of the blur size with respect to the change of depth is not the same between the front blur and the rear blur, so the front blur size becomes smaller than expected.

Therefore according to the prior arts, the blur size may become the same for the front blur and the rear blur, but efficient calculation with accurate blur sizes is difficult.

With the foregoing in view, it is an object of the present invention to provide a technique to perform the blur processing with an appropriate blur amount in accordance with the depth map using less calculation volume.

The first aspect of the present invention is an image processing apparatus for adding a blur to an image in use of depth information corresponding to the image, comprising: a conversion unit configured to convert the depth information into blur size information; a division unit configured to divide the image into a plurality image areas having a same blur size; an image generation unit configured to perform blur processing on each of the plurality of image areas with the blur size to generate blurred images; and a synthesizing unit configured to synthesize the plurality of blurred images generated by the image generation unit.

The second aspect of the present invention is an image processing method for an image processing apparatus configured to add a blur to an image in use of depth information corresponding to the image, the method comprising: a conversion step of converting the depth information into blur size information; a division step of dividing the image into a plurality of image areas having a same blur size; an image generation step of performing blur processing on each of the plurality of image areas with the blur size, and generating blurred images; and a synthesizing step of synthesizing the plurality of blurred images generated in the image generation step.

The third aspect of the present invention is a computer-readable recording medium configured to hold a computer program a non-temporary basis for a computer to execute each step of the image processing method according to the above-described image processing method.

According to the present invention, the blur processing for an appropriate blur amount in accordance with the depth map can be performed with less calculation volume.

Further features of the present invention will become apparent from the following description of exemplary embodiments with reference to the attached drawings.

BRIEF DESCRIPTION OF THE DRAWINGS

FIG. 2 is a flow chart depicting an operation of an image processing apparatus according to the embodiment;

DESCRIPTION OF THE EMBODIMENTS

Figure 1:
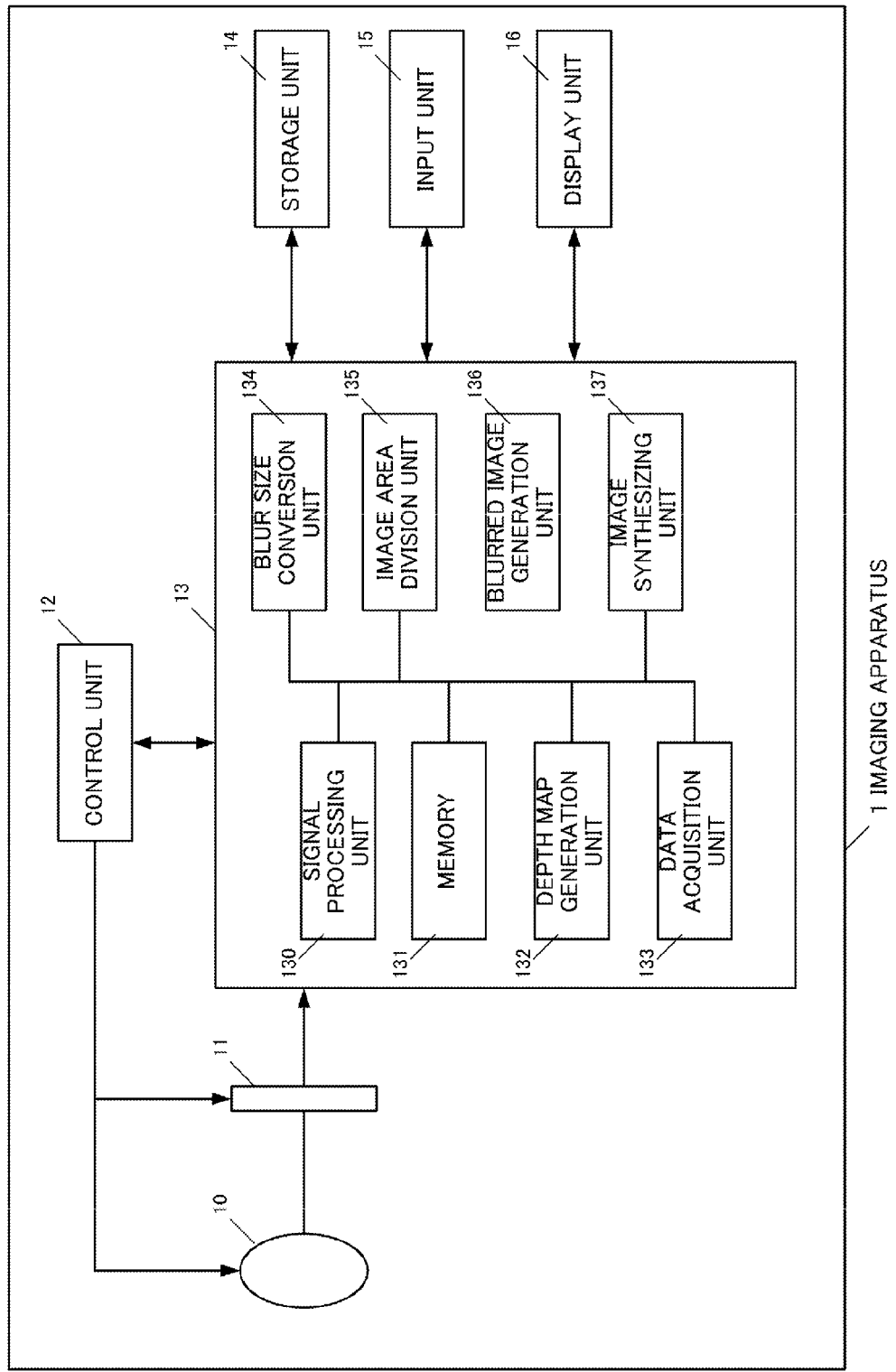
FIG. 1 is a block diagram depicting a configuration of an image processing apparatus according to an embodiment.

FIG. 1 schematically shows a configuration of an imaging apparatus according to an embodiment of the present invention. The imaging apparatus 1 includes an imaging optical system 10, an image sensor 11, a control unit 12, an image processing apparatus 13, a storage unit 14, an input unit 15 and a display unit 16.

The imaging optical system 10 is an optical system that is constituted by a plurality of lenses, and forms an image of light incident on an image plane of the image sensor 11. The image sensor 11 includes an image sensor, such as a CCD or CMOS. The image sensor 11 may be a image sensor that includes a color filter, a monochrome image sensor or a three-plate type image sensor.

The image processing apparatus 13 includes a signal processing unit 130, a memory 131, a depth map generation unit 132, a data acquisition unit 133, a blur size conversion unit 134, an image area division unit 135, a blurred image generation unit 136 and an image synthesizing unit 137. The signal processing unit 130 performs various signal processing operations, such as AD conversion of an analog signal outputted from the image sensor 11, noise removal, demosaicing, brightness signal conversion, aberration correction, white balance adjustment and color correction. The digital image data outputted from the signal processing unit 130 is stored in the memory 131, and is displayed on the display unit 16, is recorded (stored) in the storage unit 14, or is used for depth measurement (depth map generation).

The depth map generation unit 132 generates a depth map that indicates a depth of a photographed image. To generate a depth map, a method of using images with different degrees of blur, which are photographed under different photographic conditions (Depth From Defocus), or a method of using photographed image with different parallaxes (stereo method), for example, is used. Other methods, such as the Time of Flight method or the Depth From Focus method may also be used to calculate the depth. The depth information need not always include an actual distance between the imaging apparatus and an object, but may be information on an image (e.g. defocus amount) or on parallax. The depth map generated by the depth map generation unit 132 is stored in the storage unit 14 or the like.

The data acquisition unit 133 has a function to read the data of the target photographed image of the blur adding processing is performed, from the storage unit 14 (image acquisition function), and a function to read the data of a distance map corresponding to this photographed image from the storage unit 14 (depth map acquisition function). The data acquisition unit 133 also acquires data, such as optical parameters and image sensor parameters, that are set for adding blur.

The blur size conversion unit 134 has a function to convert the data of the depth map into a blur size (blur amount) according to the conditions of the blur to be added. The image area division unit 135 has a function to divide the target area of the blur processing (blur adding processing) according to the blur size determined by the blur size conversion unit 134. The image area division unit 135 divides the area so that the blur size is the same within an area. For each image area divided by the image area division unit 135, the blurred image generation unit 136 performs blur processing with the blur size of the image area, so as to generate a blurred image. The image synthesizing unit 137 has a function to synthesize each blur-added image area, and to generate each blur-added image (blurred image) having a different blur size. Details on the image processing apparatus 13 will be described later.

The storage unit 14 is a nonvolatile storage medium to store the data of photographed images, the data of a depth map, the parameter data used for the imaging apparatus 1 or the like. For the storage unit 14, any large capacity storage medium which can be read from and written to at high-speed can be used. For example, a flash memory or a DRAM is suitable for use. The input unit 15 is an interface that the user operates for inputting information to the imaging apparatus 1 or for changing a setting. For example, a dial, a button, a switch or a touch panel can be used as the input unit 15. The display unit 16 is constituted by a liquid crystal display, an organic EL display or the like. The display unit 16 is used to check the composition for photographing, view photographed or recorded images, or display various setting screens and message information. The control unit 12 controls each unit of the imaging apparatus 1. Functions of the control unit 12 include, for example, an automatic focusing the auto focus (AF), changing the focus position, changing the F value (diaphragm), loading an image, controlling a shutter or a flash (neither illustrated), and controlling the storage unit 14, the input unit 15 and the display unit 16.

Now operation of the image processing apparatus 13 will be described in detail with reference to the flow chart in FIG. 2. FIG. 2 is a flow chart depicting the processing operations, in use of the image processing apparatus 13 in FIG. 1, from acquiring a target image of the blur adding processing and a depth map, to generating, recording and displaying the blurred image.

In step S20, the data acquisition unit 133 acquires a target image of the blur adding processing, the data of depth information corresponding to this image, and such data as predetermined optical parameters and image sensor parameters which are set for adding a blur. The optical parameters include a focal length and an aperture size (or F number), and the image sensor parameters include the size of the image sensor and the number of pixels (or pixel pitch). These parameters may be those which are set at photographing, or may be set arbitrarily. Parameters are not always necessary, as mentioned later.

In step S21, the blur size conversion unit 134 converts the depth information corresponding to the target image of the blur adding processing into the blur size. One example is shown below.

Figure 3A:
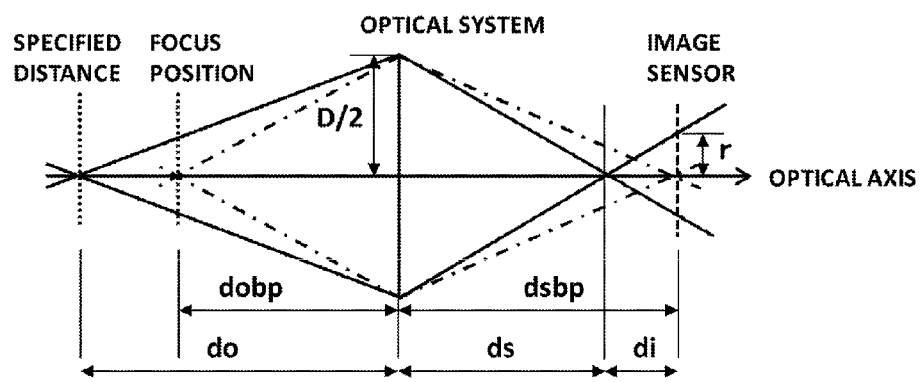
FIG. 3A and FIG. 3B are diagrams depicting an example of a method for determining a blur size and a relationship of a depth and a blur size.

FIG. 3A shows the blur amount (blur size r) on the image plane distant from the focus position. In FIG. 3A, $d_o$ corresponds to the depth information acquired in step S20, and $d_s$ denotes an image forming position at this depth, $d_{obp}$ denotes a focus position (object side), $d_{sbp}$ denotes an image forming position at the focus position, D denotes an aperture size, and $d_i$ denotes a defocus amount (image plane side). The focal length of the optical system is f, and the F number is $F_{no}$.

From the geometric relationship in FIG. 3A and the relationship of

[Math. 1]

$$D = \frac{f}{F_{no}}.$$

the blur size r is represented as follows.

[Math. 2]

$$r = \frac{1}{2F_{no}} \frac{d_o - f}{d_o} d_i \quad (1)$$

$$d_i = d_{sbp} - \frac{fd_o}{d_o - f} \quad (2)$$

$$d_{sbp} = \frac{fd_{obp}}{d_{obp} - f} \quad (3)$$

Figure 3B:
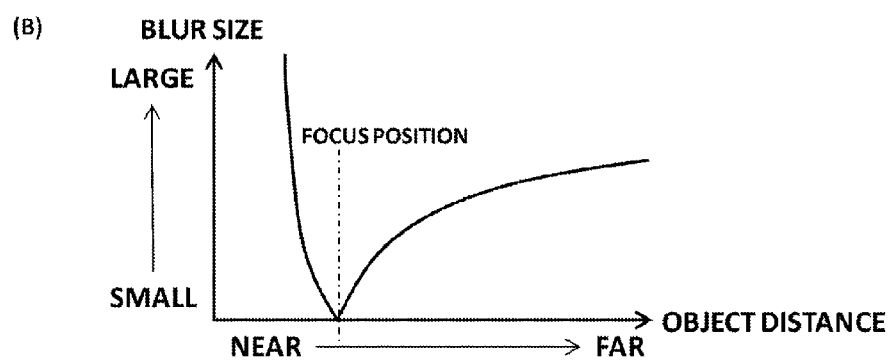

Using Expressions (2) and (3), the defocus amount $d_i$ on the image plane side can be calculated from the focus position $d_{obp}$ and the depth information $d_o$. Then the blur size r in the depth information can be determined by substituting the defocus amount $d_i$ and the depth information $d_o$ in Expression (1). If the blur size r can be derived, the blur size (blur amount) can be uniquely determined according to the conditions of the image sensor. By this processing, the relationship of the depth information and the blur size can be derived as shown in FIG. 3B, where the abscissa is the depth and the ordinate is the blur size. As shown in FIG. 3B, the blur sizes are different at the front side and the rear side of the focus position even if the distances are the same, since the change amount of the depth information and the blur size are not constant. In other words, if the blur size is determined based on the distance (absolute value) from the focus position, a correct blur size cannot be acquired. Further, from the information acquired on the blur size, a front blur or a rear blur cannot be distinguished.

The blur size conversion unit 134 need not always calculate the blur size using the above mentioned calculation formulae. A different formula may be used to calculate blur size, or a conversion table, under provided conditions, may be prepared in advance, so that the depth information is converted into the blur size by referring to the conversion table.

By the processing in step S21, the depth information is converted into the blur size, and here it is preferable to discretize the blur size into a predetermined number of ranges. Otherwise it is preferable that a range of possible values of the blur size, converted from the depth information, is divided into a plurality of ranges, and the blur size values belonging to each range are represented by one representative value. By this discretization, the number of possible values of the blur size decreases. As mentioned later, the blur processing is performed for each blur size, the number of times when the blur processing is executed decreases, and the calculation amount can be decreased.

Figure 4A:
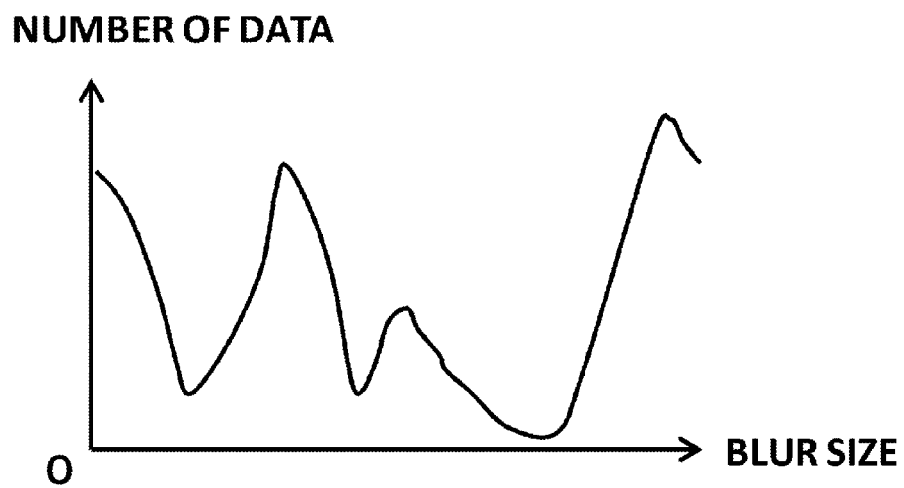
FIG. 4A and FIG. 4B are diagrams for describing a method for determining the number of divisions in discretization processing.
Figure 4B:
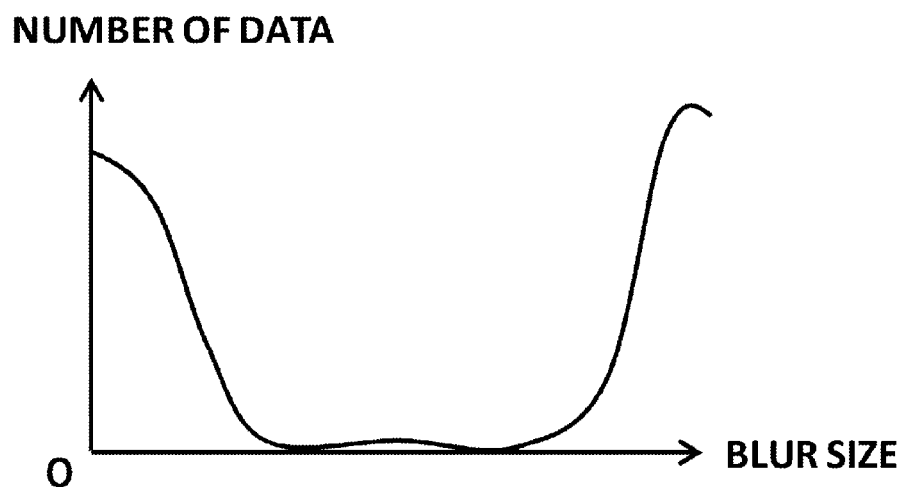

The number of divisions in the discretization processing may be a predetermined value that is stored in the storage unit 14 in advance, or may be specified by the user via the input unit 15. The number of divisions may also be determined by the blur size conversion unit 134 in accordance with the distribution of the blur size information, converted from the depth information, before discretization. For example, if the data is as shown in the histogram in FIG. 4A, the number of divisions in the discretization could be four in accordance with the peaks in the number of data. If the data is as shown in FIG. 4B, the number of divisions in the discretization is two. Obviously, the number of divisions need not be the same as the number of peaks, but may be greater or lesser. It is also possible to determine the upper limit in terms of the calculation time or the calculation resources, and to optimize the number of divisions for efficient calculation within this limit.

Figure 5:
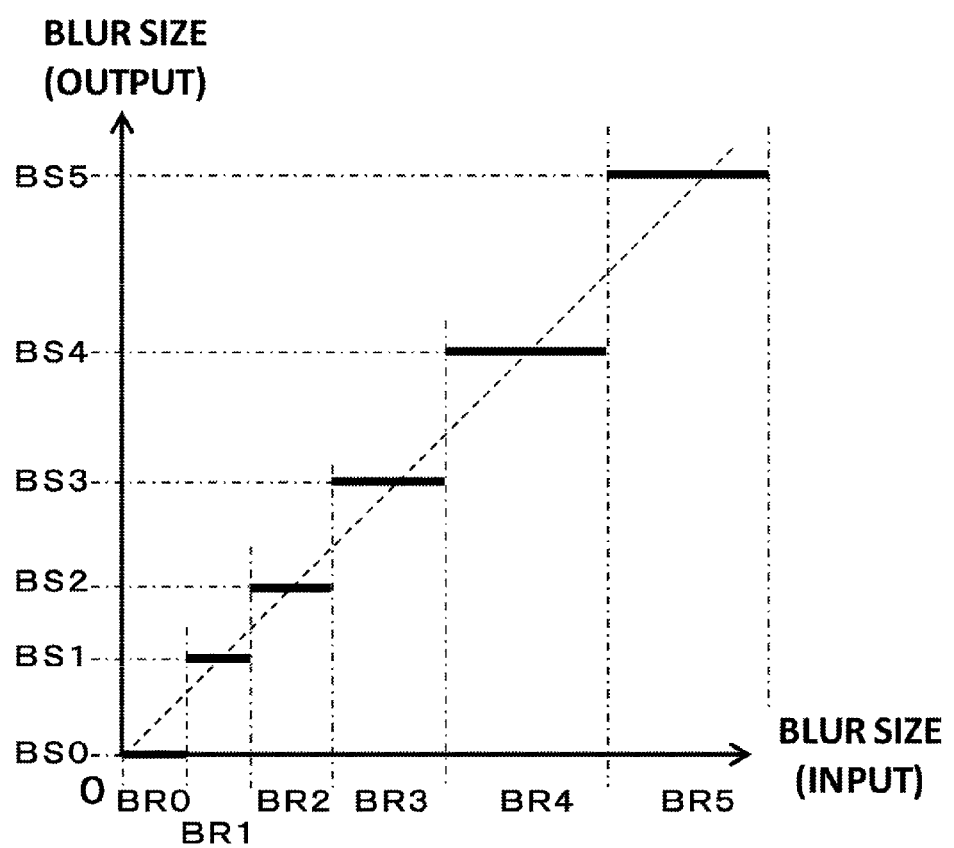
FIG. 5 is a diagram for describing the discretization processing.

The above discretization processing is processing to convert the values in a blur size range into a same blur size (representative value). FIG. 5 shows an example of the discretization processing, where the abscissa is the input value of the blur size, and the ordinate is the output value of the blur size. Here the range of the input values is divided into six, and the input values in each range are converted into a same blur size. BR0 to BR5 indicate a range of input data that is outputted as a same blur size, in order from the smallest blur size. BS0 to BS5 are representative values corresponding to each range of BR0 to BR5.

In the discretization processing, the range of the input values which are converted into a same representative value may be determined in advance. In other words, the discretization may be performed based on a conversion formula or a conversion table provided in advance. Further, the number of divisions in the discretization processing may be dynamically determined as mentioned above, where each range is set to have equal width or is increased in proportion to the blur size. Each range may also be determined based on the distribution of the blur size information converted from the depth information before discretization. For example, each blur size range may be determined such that dispersion of data in each blur size range (dispersion in a class) is minimized, and dispersion of blur size between ranges (dispersion between classes) is maximized.

For the representative value of each range, any value of the blur sizes (before discretization) included in each range may be used. For the representative value of each range, a median, mean value, mode, minimum value or maximum value of the blur sizes (before discretization) included in each range may be used. In concrete terms, BS0 is calculated from all the input data in the range of BR0. This is the same for BR1 to BR5 and for BS1 to BS5. The representative value in each range need not be determined based on a same standard. For example, when only the representative value in BS0 (a range including the blur size 0) is different from other ranges, a minimum value (that is, 0) is used as the representative value. In this case, data corresponding to BR0 is not blurred by the blur processing, and becomes the image exhibiting the best focus, which is the very data of the image when photographed. Another advantage of setting 0 for the representative value of BR0 is that the blur processing can be executed one less time.

Figure 6:
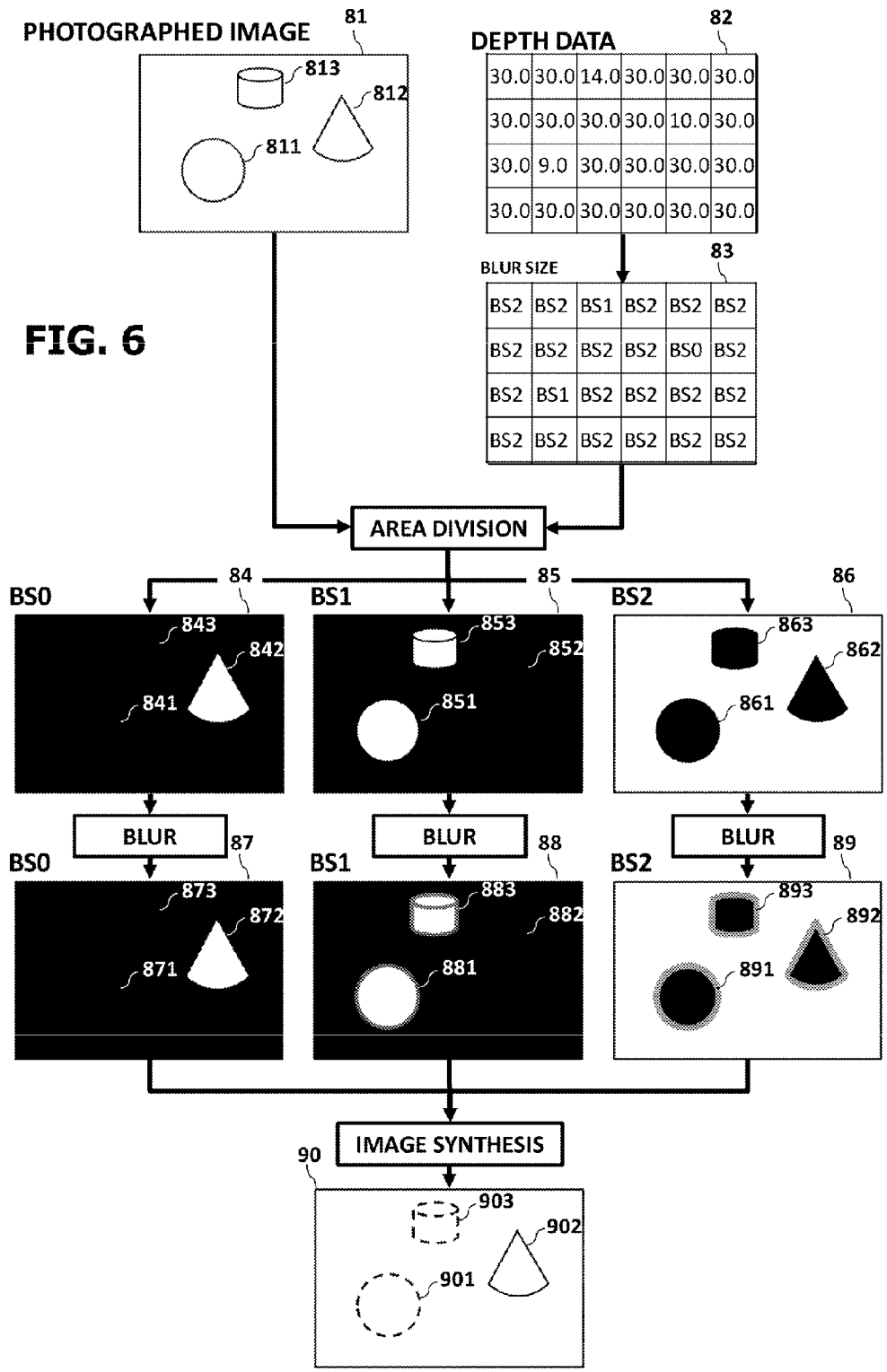
FIG. 6 is a diagram for describing a method for generating a blurred image from a photographed image and a depth map.

In step S22, the image area division unit 135 divides an area of the photographed image based on the blur size (after discretization) converted by the blur size conversion unit 134. FIG. 6 shows an example of a photographed image 81 and area division processing when the depth data 82 is converted into the blur size 83. In this example, an object 812 is in a focus position, an object 811 is in front of the focus position, and an object 813 is behind the focused position. The other area is behind the object 813 as background. By the processing in step S21, the photographed image and the pixels thereof or the blur size 83 corresponding to this area are known. The image area division unit 135 divides the photographed image 81 into areas having a same blur size respectively. An area 84 (voided portion) is a divided area of an area having the blur size BS0. In the same manner, the areas 85 and 86 are divided into areas having the blur sizes BS1 and BS2 respectively. As the area 84 shows, only the information on an object 842 is extracted, and the other information is nonexistent. In the area 85, only the information on an object 851 and object 853 is extracted, and in area 86, only the information on the background is extracted. In this way, a divided image including an area having a same blur size is generated respectively. This means that a same blur size is added to each image.

In step S23, for each image area divided in step S22, the blurred image generation unit 136 performs blur processing in accordance with the respective blur size (blur amount). Any method can be used for the blur processing method, such as the convolution operation or zooming in/out of the image. All that is required in the method for the blur processing is that a weighted mean, with peripheral pixels, can be determined in accordance with the specified blur size. The form of blur can also be arbitrary. In FIG. 6, the blur processing was performed on the areas 84, 85 and 86 respectively, and the area blur processing results 87, 88 and 89 were acquired.

In step S24, the image synthesizing unit 137 synthesizes the blur processing results, 87, 88 and 89 of each area in FIG. 6. For the synthesis, a simple sum may be determined, but if the synthesizing ratio of the boundary portion of each area is calculated based on the data of the depth information, optical parameters, image sensor parameters or the like, then a high quality synthesis becomes possible.

It is preferable for efficiency that the front blur and the rear blur having a same blur size are simultaneously blur-processed, but it is preferable to synthesize the front blur and the rear blur separately. In other words, the objects 881 and 883 in the area blur processing result 88 have the same blur size, but have different depths (front blur and rear blur) in the information on depth data 82, so if a different synthesizing method is used for the synthesizing processing, a higher quality image can be generated. However it is not always necessary to consider the front blur and the rear blur separately when the synthesis is performed, but the front blur and the rear blur may be simultaneously synthesized.

According to the above mentioned method of this embodiment, when blur processing for an area including both the front blur and the rear blur is performed, the area is divided based on the blur size, therefore blur processing corresponding to the correct blur size can be performed without distinguishing the front blur and the rear blur. Thereby the calculation volume can be decreased considerably.

(Modifications)

In the above embodiment, the imaging apparatus that photographs an image and a depth map was described as an example, but a method for acquiring an image and a depth map is arbitrary, and need not always be acquired by photographing. For example, an example of the present invention is an image processing apparatus that acquires a photographed image and a depth map from a storage medium or via a network, and performs the above mentioned processing on the acquired image and depth map.

The target image to add blur need not always be an actual photographed image either. For example, the image may be generated by three-dimensional computer graphics. In this case, the depth map represents the depth from a virtual camera to an object.

The above mentioned technique of the present invention can be suitably applied to an imaging apparatus, such as digital camera and a digital camcorder, or an image processing apparatus or a computer that performs image processing on image data acquired by an imaging apparatus. Further the technique of the present invention can also be applied to various electronic apparatuses (including portable phones, smartphones, slate terminals and personal computers) housing this imaging apparatus or imaging processing apparatus, and to a server in a cloud environment. The technique of the present invention can be installed on apparatuses either by software (computer programs) or by hardware. For example, each processing to achieve the object of the present invention may be implemented by storing a program in a memory of a computer (e.g. microcomputer, CPU, MPU, FPGA) housed in the imaging apparatus or the image processing apparatus, and allowing the computer to execute a program. It is also preferable to install a dedicated processor, such as an ASIC, to implement all or a part of the processing operations of the present invention by a logic circuit.

Furthermore, the present invention can also be carried out by a method that includes steps executed by a computer of a system or an apparatus which is configured to implement the functions of the embodiment by reading and executing a program recorded in a storage device. To achieve the object, this program is provided to the computer via a network, or via various types of recording media (that is, a computer readable recording medium configured to hold a computer program on a non-temporary basis), for example. Therefore this computer (including such a device as a CPU and an MPU), this method, this program (including program code and program product), and this non-transitory computer-readable recording medium stores this program are all included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-174429, filed on Aug. 26, 2013, which is hereby incorporated by reference herein in its entirety.

What is claimed is:

1. An image processing apparatus for adding a blur to an image in use of depth information corresponding to the image, comprising:
   a conversion unit configured to convert the depth information into blur size information;
   a division unit configured to divide the image into a plurality image areas having a same blur size;
   an image generation unit configured to perform blur processing on each of the plurality of image areas with the blur size to generate blurred images; and
   a synthesizing unit configured to synthesize the plurality of blurred images generated by the image generation unit.

2. The image processing apparatus according to claim 1, wherein the conversion unit is further configured to perform discretization processing that divides a range of values of the blur sizes, converted from the depth information, into a plurality of ranges, and to set one representative value to represent the blur sizes belonging to respective ranges.

3. The image processing apparatus according to claim 2, wherein the number of divisions in the discretization processing is a predetermined value.

4. The image processing apparatus according to claim 2, wherein the number of divisions in the discretization processing is a value specified by a user.

5. The image processing apparatus according to claim 2, wherein the number of divisions in the discretization processing is determined based on the distribution of the blur sizes converted from the depth information.

6. The image processing apparatus according to claim 2, wherein the plurality of ranges in the discretization processing is predetermined.

7. The image processing apparatus according to claim 2, wherein the plurality of ranges in the discretization processing is determined based on the distribution of the blur sizes converted from the depth information.

8. The image processing apparatus according to claim 2, wherein each of the representative values of the plurality of ranges in the discretization processing is any one of values included in the respective ranges.

9. The image processing apparatus according to claim 2, wherein each of the representative values of the plurality of ranges in the discretization processing is one of a median, a mean value, a mode, a minimum value and a maximum value of the blur sizes included in the range.

10. The image processing apparatus according to claim 2, wherein the representative value of a range including the blur size 0 in the discretization processing is 0.

11. The image processing apparatus according to claim 1, wherein the conversion unit converts the depth information into the blur size based on at least optical parameters or image sensor parameters.

12. The image processing unit according to claim 1, wherein the synthesizing unit synthesizes the blurred images generated by the image generation unit at a synthesizing ratio in accordance with the depth information.

13. An imaging apparatus comprising:
   an imaging unit; and
   the image processing apparatus according to claim 1, wherein
   the image processing apparatus is configured to add a blur to an image photographed by the imaging unit.

14. An image processing method for an image processing apparatus configured to add a blur to an image in use of depth information corresponding to the image,
   the method comprising:

a conversion step of converting the depth information into blur size information;

a division step of dividing the image into a plurality of image areas having a same blur size;

an image generation step of performing blur processing on each of the plurality of image areas with the blur size, and generating blurred images; and a synthesizing step of synthesizing the plurality of blurred images generated in the image generation step.

15. The image processing method according to claim 14, wherein in the conversion step, discretization processing that divides a range of values of the blur sizes, converted from the depth information, into a plurality of ranges, and sets one representative value to represent the blur sizes belonging to respective ranges is performed.

16. The image processing method according to claim 15, wherein the number of divisions in the discretization processing is a predetermined value, or a value specified by the user, or is determined based on the distribution of the blur sizes converted from the depth information.

17. The image processing method according to claim 15, wherein the plurality of ranges in the discretization processing is predetermined, or is determined based on the distribution of the blur sizes converted from the depth information.

18. The image processing method according to claim 14, wherein in the conversion step, the depth information is converted into the blur size based on at least optical parameters or image sensor parameters.

19. The image processing method according to claim 14, wherein in the synthesizing step, the blurred images generated in the image generation step are synthesized at a synthesizing ratio in accordance with the depth information.

20. A non-transitory computer-readable recording medium configured to hold a computer program a non-temporary basis for a computer to execute each step of the image processing method according to claim 14.

* * * * *